United States Patent [19]
Furuya et al.

[11] Patent Number: 6,048,910
[45] Date of Patent: Apr. 11, 2000

[54] COATING COMPOSITIONS, HYDROPHILIC FILMS, AND HYDROPHILIC FILM-COATED ARTICLES

[75] Inventors: Masahiro Furuya; Masaaki Yamaya, both of Usui-gun, Japan

[73] Assignee: Shin-Etsu Chemical Co., Ltd., Japan

[21] Appl. No.: 09/017,711

[22] Filed: Feb. 5, 1998

[30] Foreign Application Priority Data

Feb. 6, 1997 [JP] Japan .................................. 9-038487

[51] Int. Cl.⁷ .............................. C08K 3/28; C08K 83/00; C08J 7/04; B32B 13/04; B32B 9/04
[52] U.S. Cl. ................................ 522/86; 522/81; 522/84; 522/83; 524/837; 427/515; 428/446; 428/447
[58] Field of Search .................................. 522/86, 83, 84, 522/81; 524/837; 427/515; 428/446, 447

[56] References Cited

U.S. PATENT DOCUMENTS

| | | | |
|---|---|---|---|
| 5,480,919 | 1/1996 | Liles et al. | 522/86 |
| 5,616,532 | 4/1997 | Heller et al. | 502/242 |
| 5,708,048 | 1/1998 | Medford et al. | 522/64 |
| 5,755,867 | 5/1998 | Chikuni et al. | 106/287.16 |
| 5,786,414 | 7/1998 | Chikuni et al. | 524/413 |
| 5,844,060 | 12/1998 | Furuya et al. | 528/30 |
| 5,849,200 | 12/1998 | Heller et al. | 210/48 |

FOREIGN PATENT DOCUMENTS

| | | |
|---|---|---|
| 633 064 | 1/1995 | European Pat. Off. . |
| 752 441 A2 | 1/1997 | European Pat. Off. . |
| 816 466 | 1/1998 | European Pat. Off. . |
| 9-71654 | 3/1997 | Japan . |
| 9-227829 | 9/1997 | Japan . |
| 97/45502 | 12/1997 | WIPO . |

OTHER PUBLICATIONS

English Abstract for WO97/45502 (first page of patent).
European Search Report for EP 98 30 0853 mailed Dec. 4, 1998.

*Primary Examiner*—James J. Seidleck
*Assistant Examiner*—Sanza McClendon
*Attorney, Agent, or Firm*—Millen, White, Zelano & Branigan, P.C.

[57] ABSTRACT

A coating composition which is comprised of an emulsion of a silicone resin, typically a water-insoluble, silanol group-bearing silicone resin dispersed in water, and contains photocatalyst particles, typically titanium oxide forms a hydrophilic film having a water-drop contact angle of no more than 60° when irradiated with UV-containing light. The composition eliminates the use of organic solvents and has excellent dispersion and storage stability. Films obtained by applying this coating composition to the surface of substrates have excellent weathering resistance and antifouling properties due to a self-cleaning effect arising from the photocatalytic action of the particles.

14 Claims, No Drawings

COATING COMPOSITIONS, HYDROPHILIC FILMS, AND HYDROPHILIC FILM-COATED ARTICLES

BACKGROUND OF THE INVENTION

1. Field of the Invention

The present invention relates to coating compositions which are effectively used to protect the surface of articles directly exposed to the atmosphere, such as buildings and structures, and which can form hydrophilic films having excellent antifouling properties. The invention relates also to hydrophilic films obtained from the above compositions, and to articles which have been coated with these hydrophilic films.

2. Prior Art

Silicone resins and fluorocarbon resins having excellent corrosion resistance and weathering resistance are commonly employed in exterior paints used on buildings and structures which are directly exposed to the elements. Coatings composed of these resins experience little degradation from acid rain and long-term exposure to sunlight. These paints were generally thought to have excellent antifouling properties. However, in long-term weathering tests, it became apparent that contaminants originating from atmospheric grime, dust and grit, iron particles, and acid rain gradually deposit onto the surface of the film, causing a deterioration in the appearance of the film. This demonstrated the inadequacy of antifouling properties.

One known method for conferring antifouling properties to such coatings is by adding an alkyl silicate as a silanol group precursor to a coating composition to thereby hydrophilize the surface of coatings, enabling to utilize the self-cleaning effect that contaminants are washed away by rainwater. This method can prevent contaminant adsorption for a while, but the self-cleaning effect does not last long because the coatings are poorly water resistant, allowing the hydrophilizing substance to be readily carried away and contaminants to become firmly attached to the coating surface. Prior-art techniques for preventing the deposition of contaminants by rendering the coating surface hydrophilic have thus been inadequate in terms of the durability and persistence of the desired effect.

It was recently discovered to render coatings hydrophilic by adding particulate photocatalysts, typically titanium oxide (see International Patent Application WO 96/29375). When the photocatalyzed coating is irradiated with UV-containing light, the coating acquires a hydrophilicity such that the water-drop contact angle of the coating surface becomes 10° or less. This is regarded as a hydrophilization system in which electrons and holes form at the surface of the photocatalyst particles upon exposure to light; and oxygen and water in the air are oxidized and reduced here, generating active radical species which then partially decompose the silicone resin serving as the binder, forming hydrophilic silanol groups at the surface, where moisture in the air is then adsorbed. Deposited organic contaminants are self-cleaned from the coating surface with rainwater. Even the contaminants that firmly adhere to the coating surface are completely oxidized and decomposed by the radical species generated in situ, and hydrophilic properties are thus maintained. Furthermore, because numerous hydroxyl groups are present at the surface of photocatalyst particles, typically titanium oxide, the particles are strongly bound by the binder resin and are not carried away from the coating. The antifouling properties can thus be sustained semi-permanently.

One known example of the generation of radicals by a photocatalyst is the degradative deterioration (chalking) by sunlight of coatings in which titanium oxide is used as a white pigment. Pigment-grade titanium oxide is generally covered on the surface with metal oxides such as silica and alumina, which largely, but not completely, prevent the formation of radicals. In long-term exposure tests on coatings, the erosion of resin from the periphery of pigment particles is due to the degradation of the resin by a small amount of radicals that are generated. Therefore, the binder resin in hydrophilizable photocatalyzed coatings must meet the requirements that it is not readily subject to chalking, and only the sub-surface layer of the coating is hydrophilized due to slight degradation of the resin by the attack of radicals. Silicone resins and modified silicone resins are suitable as such resins.

The silicone resins used as binders in paints and coating agents are generally diluted with organic solvents. Even the photocatalyzed coating compositions of the above-referred WO 96/29375 invariably contain organic solvents for dissolving the silicone resin. However, problems associated with the use of organic solvents, such as environmental contamination, toxicity to workers during application, and fire and explosion hazards, have led to a greater demand for water-based coating compositions.

When designing a water-based silicone resin coating composition, one method uses water-soluble silicone resins and another method uses emulsions of water-insoluble silicone resins dispersed in water. Water-soluble silicone resins can be synthesized from hydrophilic functional group-bearing silane compounds, but the coatings obtained with the use of these resins all have a poor water resistance, inadequate film hardness and poor weathering resistance. In contrast, silicone resin emulsion-type coating compositions are suitable as aqueous coating compositions because hydrophilic groups need not be incorporated within the resin and water resistance is excellent.

The methods which have been proposed for producing aqueous emulsions containing silicone resins are generally classified into the following six types.

(1) A method whereby alkoxysilane compounds, or partial hydrolyzates and condensates thereof, are emulsified using various surfactants to form aqueous emulsions (see JP-A 213046/1983, JP-A 197369/1987, JP-A 115485/1991, and JP-A 200793/1991). Mixtures of such an aqueous emulsion with an emulsion obtained by the emulsion polymerization of a polymerizable vinyl monomer are also known (see JP-A 344665/1994).

(2) A method in which a solventless solid silicone resin is mechanically ground and dispersed together with a chain silicone compound to form an aqueous emulsion (see JP-A 247434/1995).

(3) A method whereby a radical-polymerizable vinyl monomer is emulsion polymerized in the presence of a water-soluble polymer obtained by hydrolyzing an alkoxysilane in water, and without using a surfactant (see JP-A 60098/1996).

(4) A method in which an alkoxysilane mixture containing a vinyl polymerizable alkoxysilane is hydrolyzed and condensed to form an aqueous emulsion containing a solid silicone resin, a radical-polymerizable vinyl monomer is added thereto, and emulsion polymerization is carried out, thereby forming an emulsion of graft copolymer fine particles (solid) (see JP-A 209149/1993 and JP-A 196750/1995).

(5) A method whereby an alkoxysilane is added to an emulsion obtained by the emulsion polymerization of a radical-polymerizable functional group-bearing monomer, and hydrolysis and condensation are carried out, thereby incorporating silicone resin into the emulsion particles (see JP-A 45628/1991 and JP-A 3409/1996).

(6) A method in which a vinyl polymerizable functional group-containing alkoxysilane is emulsion polymerized together with a radical-polymerizable vinyl monomer to form an emulsion (see JP-A 9463/1986 and JP-A 27347/1996).

Coating compositions containing silicone resin emulsions prepared by the above known methods are able to produce coatings endowed with relatively good weathering resistance. However, as with ordinary silicone resin coatings, they are readily subject to the deposition of grime, soot and the like with long-term outdoor exposure. Hence, it would be very desirable to impart antifouling properties to such coatings.

SUMMARY OF THE INVENTION

It is therefore an object of the present invention to provide a water-dispersed emulsion coating composition which is useful in exterior wall paints and coating agents applied to outdoor buildings and structures as well as in other applications, which forms a highly weathering-resistant, antifouling film with a surface that becomes hydrophilic when exposed to UV-containing light and exhibits excellent self-cleaning properties, and which is substantially free of organic solvents from the standpoints of minimized environmental contamination and a safe working environment.

Another object of the invention is to provide a hydrophilic film obtained from the coating composition.

Yet another object is to provide an article coated with the hydrophilic film.

We have found that the above and other objects are attained by-a composition comprising a water-dispersed emulsion containing a silicone resin as the main component and a particulate photocatalyst which is effective for hydrophilizing the coating surface.

Appropriate silicone resins are silanol group-bearing silicone resins, and particularly those of the following average compositional formula (1):

$$R^1_m R^2_n Si(OR^3)_p (OH)_q O_{(4-m-n-p-q)/4} \quad (1)$$

wherein $R^1$ is an unsubstituted monovalent hydrocarbon group; $R^2$ is a substituted monovalent hydrocarbon group; $R^3$ is an unsubstituted or substituted monovalent hydrocarbon group; and the letters m, n, p and q are numbers falling in the ranges $0.3 \leq m \leq 1.8$, $0 \leq n \leq 1.0$, $0 \leq p \leq 2.0$, $0 < q \leq 1.7$, $0.3 \leq m+n \leq 1.8$, $0 < p+q \leq 3.0$ and $0.3 < m+n+p+q < 4.0$. We have further found that when a solution obtained by mixing a silicone resin having formula (1) with a dical-polymerizable vinyl monomer, and especially a radical-polymerizable vinyl monomer containing a vinyl-polymerizable functional group-bearing hydrolyzable silane of the general formula (2) to be defined later is emulsion polymerized, there is obtained a coating composition capable of forming, upon exposure to ultraviolet radiation, a hydrophilic film which sustains hydrophilic properties semi-permanently and has better weathering resistance and antifouling properties. Moreover, this coating composition has an excellent stability as well as safety during application.

More particularly, when the silicone resin in the coating formed by this composition contains reactive groups, the coating cures into a strong film through the crosslinking reaction the reactive groups undergo at room temperature or elevated temperature. Since photocatalyst particles are dispersed within the film and typically composed of a metal oxide, chemical bonding arises between hydroxyl groups on the surface of the particles and silanol groups in the silicone resin, as a result of which the photocatalyst particles are immobilized both on the film surface and at the film interior.

When the coating is irradiated with UV-containing light, the water-drop contact angle of the coating surface decreases to about 60° or less on account of the oxidizing effect by the photocatalyst particles. With continued exposure to sunlight, the contact angle decreases further with the increasing dose of light, so that a contact angle of about 10° or less may ultimately be obtained. The present invention is based on these findings.

In a first aspect, the present invention provides a coating composition comprising an emulsion of a silicone resin dispersed in water, and photocatalyst particles. The composition forms a hydrophilic film having a water-drop contact angle of no more than 60° when irradiated with UV-containing light.

Preferably, the photocatalyst particles comprise at least one metal oxide selected from titanium oxide, cerium oxide and zinc oxide. The photocatalytic particles may preferably be contained in an amount of 50 to 200 parts by weight per 100 parts by weight of the silicone resin.

In one preferred embodiment, the silicone resin is a water-insoluble, silanol group-bearing silicone resin of the average compositional formula (1):

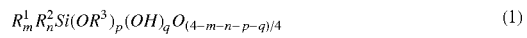

$$\quad (1)$$

wherein $R^1$ is an unsubstituted monovalent hydrocarbon group; $R^2$ is a substituted monovalent hydrocarbon group; $R^3$ is an unsubstituted or substituted monovalent hydrocarbon group; and letters m, n, p and q are numbers falling in the ranges: $0.3 \leq m \leq 1.8$, $0 \leq n \leq 1.0$, $0 \leq p \leq 2.0$, $0 < q \leq 1.7$, $0.3 \leq m+n \leq 1.8$, $0 < p+q \leq 3.0$ and $0.3 < m+n+p+q < 4.0$.

The emulsion of a silicone resin dispersed in water is preferably of an emulsion polymer which has been obtained from (i) 100 parts by weight of a water-insoluble, silanol group-bearing silicone resin of the average compositional formula (1) and (ii) 10 to 1,000 parts by weight of a radical-polymerizable vinyl monomer as main components. The emulsion substantially does not contain organic solvents having a boiling point of less than 100° C. and aromatic organic solvents. The radical-polymerizable vinyl monomer typically contains 0.01 to 10 mol % of a vinyl-polymerizable functional group-bearing hydrolyzable silane of the general formula (2):

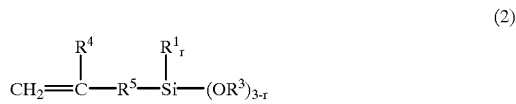

$$\quad (2)$$

wherein $R^4$ is a hydrogen atom or a methyl group; $R^5$ is a divalent organic group; letter r is 0, 1 or 2; and $R^1$ and $R^3$ are as defined above. More preferably, the emulsion of a silicone resin dispersed in water has been obtained by emulsion polymerization of the mixture of the water-insoluble, silanol group-bearing silicone resin of formula (1) and the radical-polymerizable vinyl monomer. Especially, the emulsion of a silicone resin dispersed in water has been obtained by the following steps comprising:

(a) obtaining a reaction mixture containing the silanol group-bearing silicone resin of formula (1) by hydrolyzing and condensing a hydrolyzable silane in water, (b) removing a by-product of hydrolysis from the reaction mixture to leave only the silanol group-bearing silicone resin and water, (c) adding a radical-polymerizable vinyl monomer to the system consisting essentially of the silanol group-bearing silicone resin and water, dissolving the silanol group-bearing silicone resin in the radical-polymerizable vinyl monomer, and then removing water therefrom to obtain a silanol group-bearing silicone resin-containing solution of the radical-polymerizable vinyl monomer, and (d) emulsion polymerizing the silicone resin-containing solution in the presence of a surfactant.

In a second aspect, the invention provides a hydrophilic film formed from the coating composition defined above and irradiated with UV-containing light. The film has a surface presenting a water-drop contact angle of no more than about 60°.

In a third aspect, the invention provides an article or object coated with the hydrophilic film.

DETAILED DESCRIPTION OF THE INVENTION

The coating composition of the invention is comprised of an emulsion of a silicone resin dispersed in water which may be, for example, any of emulsions obtained by the above-described methods (1) to (6). The coating composition of the invention is obtained by adding photocatalyst particles to an emulsion prepared by any of these well-known methods, followed by dispersion. This composition is applied and cured to form a coating, which becomes hydrophilic upon exposure to UV-containing light, acquiring a water-drop contact angle of no more than 60° and exhibiting excellent antifouling properties.

However, changes with time in the emulsion itself or in the composition obtained by mixing together the emulsion and the photocatalyst particles can sometimes be a problem.

For example, in emulsion preparation methods (1) and (3) to (6), when a silane compound is added to water, its alkoxy groups come into direct contact with water and undergo partial hydrolysis, inevitably resulting in the formation of alcohol by-products, which lowers the stability of the emulsion and also leads to an increase in the molecular weight of the resin. It is therefore difficult to maintain the storage stability of emulsions produced by these methods, and increasing the content of the silicone ingredient only serves to further reduce the storage stability. Method (2) provides the advantage that alcohol does not form, but because the aqueous emulsion is dispersed by mechanical agitation, it is difficult to achieve a small particle size, and so the emulsion stability is poor. Hence, with the methods known to the prior art, it is often difficult, and requires some ingenuity, to produce stably dispersed silicone resin emulsions which are substantially free of organic solvent and have a high silicone resin content.

Furthermore, in coating compositions where both an emulsion and photocatalyst particles are present together, it is desirable to achieve as well the dispersion stability of the photocatalyst particles. The photocatalyst particles disperse throughout the liquid via electrostatic repulsions between surface charges thereon. If an organic solvent having a low dielectric constant forms as a by-product, the photocatalyst particles tend to agglomerate, which is why it is best to minimize alcohol formation. To maintain the photocatalyst particles dispersed, it is sometimes necessary to adjust the pH of the composition within a broad range of from strongly acidic to strongly alkaline. The emulsion is required to remain stable even under such demanding conditions.

One method that is especially suitable for producing such highly stable emulsions involves the steps of hydrolyzing and condensing a hydrolyzable silane to form a silicone resin, mixing the silicone resin with a radical-polymerizable vinyl monomer to form a monomeric mixture containing substantially no organic solvent, and emulsion polymerizing the monomeric mixture in water. More preferred method involves the following steps comprising:

(a) obtaining a reaction mixture containing the silanol group-bearing silicone resin of formula (1) by hydrolyzing and condensing a hydrolyzable silane in water, (b) removing a by-product of hydrolysis from the reaction mixture to leave only the silanol group-bearing silicone resin and water, (c) adding a radical-polymerizable vinyl monomer to the system consisting of the silanol group-bearing silicone resin and water, dissolving the silanol group-bearing silicone resin in the radical-polymerizable vinyl monomer, and then removing water therefrom to obtain a silanol group-bearing silicone resin-containing solution of the radical-polymerizable vinyl monomer, and (d) emulsion polymerizing the silicone resin-containing solution in the presence of a surfactant. Methods for preparing the silicone resin of which this emulsion is composed and methods for producing emulsions containing this silicone resin are described more fully below.

The silicone resin used in the invention is preferably a silanol group-bearing silicone resin, and especially one having the following average compositional formula (1):

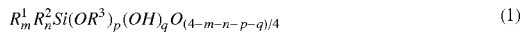

wherein $R^1$ is an unsubstituted monovalent hydrocarbon group; $R^2$ is a substituted monovalent hydrocarbon group; $R^3$ is an unsubstituted or substituted monovalent hydrocarbon group; and letters m, n, p and q are numbers falling in the ranges: $0.3 \leq m \leq 1.8$, $0 \leq n \leq 1.0$, $0 \leq p \leq 2.0$, $0 < q \leq 1.7$, $0.3 \leq m+n \leq 1.8$, $0 < p+q \leq 3.0$ and $0.3 < m+n+p+q < 4.0$.

The unsubstituted monovalent hydrocarbon group $R^1$ in formula (1) preferably has from 1 to 10 carbon atoms. Examples include alkyl groups such as methyl, ethyl, propyl, isopropyl, butyl, t-butyl, hexyl, cyclohexyl, octyl and decyl; alkenyl groups such as vinyl, allyl, 5-hexenyl and 9-decenyl; and aryl groups such as phenyl. Of these, methyl, propyl, hexyl and phenyl are preferable. Methyl groups are preferable when weathering resistance is required, the use of long-chain alkyl groups is advantageous for more quickly rendering the coating hydrophilic, and phenyl groups are preferable when the coating is to be imparted with flexibility.

The substituted monovalent hydrocarbon group $R^2$ is the above-described unsubstituted monovalent hydrocarbon group having from 1 to 10 carbons in which some or all of the hydrogen atoms have been substituted. Examples of substituents that may be used include (1) halogen atoms such as fluorine and chlorine, (2) epoxy functional groups such as glycidyloxy and epoxycyclohexyl, (3) (meth)acryl functional groups such as methacryl and acryl, (4) amino functional groups such as amino, aminoethylamino, phenylamino and dibutylamino, (5) sulfur-containing functional groups such as mercapto and tetrasulfide, (6) alkyl ether groups such as (polyoxyalkylene)alkyl ether, (7) anionic groups such as carboxyl and sulfonyl, and (8) quaternary ammonium salt structure-containing groups. Of these, epoxy functional groups (2) and (meth)acryl functional groups (3) are preferable as reactive groups. Exemplary substituted monovalent hydrocarbon groups include trifluoropropyl, perfluorobutylethyl, perfluorooctylethyl, 3-chloropropyl, 2-(chloromethylphenyl)ethyl, 3-glycidyloxypropyl, 2-(3,4-epoxycyclohexyl)ethyl, 3-(meth)acryloxypropyl, (meth) acryloxymethyl, 3-aminopropyl, N-(2-aminoethyl) aminopropyl, 3-(N-phenylamino)propyl, 3-dibutylaminopropyl, 3-mercaptopropyl, polyoxyethyleneoxypropyl, 3-hydroxycarbonylpropyl and 3-tributylammonium propyl. The use of epoxy, amino and mercapto functional groups is desirable for enhancing adhesion to the substrate. When copolymerization with a vinyl polymer is to be carried out, the use of radical-polymerizable (meth)acryl functional groups, or mercapto functional groups which act as a chain transfer agent, is preferred. When attempting crosslinkage with a vinyl polymer using bonds other than siloxane bonds, it is sufficient to introduce functional groups capable of reacting with the organic functional groups on the vinyl polymer. Examples include the reaction of epoxy groups with hydroxy groups, amino groups, carboxyl groups and the like; and the reaction of amino groups with acid anhydride groups.

The $OR^3$ group in formula (1) is a hydrolyzable group in which $R^3$ may be, for example, an unsubstituted monovalent hydrocarbon group such as an alkyl group with 1 to 6 carbon atoms, an alkenyl group or an aryl group; or an alkoxy-substituted monovalent hydrocarbon group such as an alkoxyalkyl. Examples of the hydrolyzable group $OR^3$ include methoxy, ethoxy, propoxy, isopropoxy, butoxy, sec-butoxy, t-butoxy, isopropenoxy and phenoxy. The use of methoxy, ethoxy and isopropoxy groups is especially preferred for reasons having to do with the hydrolyzability and condensation reactivity, as well as the stability within the emulsion.

The number of unsubstituted hydrocarbon groups m and the number of substituted hydrocarbon groups n fall in the ranges: $0.3 \leq m \leq 1.8$, $0 \leq n \leq 1.0$ and $0.3 \leq m+n \leq 1.8$. The number of hydrolyzable groups p and the number of silanol groups q fall in the ranges: $0 \leq p \leq 2.0$, $0 < q \leq 1.7$, and $0 < p+q \leq 3.0$. When m is less than 0.3, the content of non-functional organic groups $R^1$ is low, so that the coating becomes too hard, and cracking tends to arise in the cured coating. On the other hand, when m is more than 1.8, the large number of resulting chain units gives the cured coating a rubbery quality which deprives it of adequate resistance to marring. A value for m within the range of 0.5 to 1.5 is even more preferable. When n is more than 1.0, the high content of bulky organic functional groups $R^2$ makes it difficult to maintain the film hardness, in addition to which the weathering resistance declines. Hence, n is a number that falls in the range of 0 to 1.0, and preferably the range of 0.05 to 0.8. If it is not necessary to impart the above-described capabilities arising from the organic functional group $R^2$, this organic functional group $R^2$ need not be included. The sum m+n falls in the range of 0.3 to 1.8, and preferably in the range of 0.5 to 1.5. The reasons for setting this optimal range in m+n are the same as the reasons given above for m. The silanol groups are essential, but a silanol group content q in excess of 1.7 is undesirable because the silicone resin becomes unstable. To assure a good storage stability as well as a high curability, a range for q of 0.001 to 1.5 is more preferable, and a range of 0.05 to 0.8 is most preferable. In addition to the silanol groups, crosslinkable hydrolyzable groups $OR^3$ may also be present in an amount where p ranges from 0 to 2.0, and preferably from 0 to 1.0. Above this range, hydrolysis readily occurs in water, resulting in the undesirable formation within the system of alcohol, an organic solvent, as a by-product. The sum p+q of the crosslinkable substituents must fall in a range of $0 < p+q \leq 3.0$, and preferably $0 < p+q \leq 1.0$. When this sum is 0, curing does not take place, and when it exceeds 3.0, the molecules become small and the water solubility becomes good, which is undesirable. In addition, m, n, p and q satisfy $0.3 < m+n+p+q < 4.0$.

Silicone resins which can be employed in the invention must satisfy the above conditions, and at the same time, they must also contain silanol groups and not be soluble by themselves in water. If they are soluble in water, undesirably the silicone is not completely incorporated into the dispersed particles during emulsification with a homomixer or during emulsion polymerization. Accordingly, even though the silicone resin may be produced by any method so long as the above conditions are satisfied, the use of the methods described below is preferred.

Silicone resins having above formula (1) can be obtained by hydrolyzing and condensing a mono- to tetra-functional silane compound (hydrolyzable silane). Examples of the starting hydrolyzable silane include, without limitation, methyltrichlorosilane, methyltrimethoxysilane, methyltriethoxysilane, ethyltrichlorosilane, ethyltrimethoxysilane, ethyltriethoxysilane, n-propyltrichlorosilane, n-propyltrimethoxysilane, n-propyltriethoxysilane, n-hexyltrichlorosilane, n-hexyltrimethoxysilane, n-hexyltriethoxysilane, n-decyltrimethoxysilane, n-decyltriethoxysilane, phenyltrichlorosilane, phenyltrimethoxysilane, phenyltriethoxysilane, tetrachlorosilane, tetramethoxysilane, tetraethoxysilane, dimethoxydiethoxysilane, dimethyldichlorosilane, dimethyldimethoxysilane, dimethyldiethoxysilane, diphenyldichlorosilane, diphenyldimethoxysilane, diphenyldiethoxysilane, phenylmethyldichlorosilane, phenylmethyldimethoxysilane, phenylmethyldiethoxysilane, trichlorohydrosilane, trimethoxyhydrosilane, triethoxyhydrosilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, 2-(3,4-epoxycyclohexyl)ethyltrimethoxysilane, 2-(3,4-epoxycyclohexyl)ethyltriethoxysilane, 3-(meth)acryloxypropyltrimethoxysilane, 3-(meth)acryloxypropyltriethoxysilane, 3-(meth)acryloxypropylmethyldimethoxysilane, 3-(meth)acryloxypropylmethyldiethoxysilane, 3-aminopropyltrimethoxysilane, 3-aminopropyltriethoxysilane, 3-aminopropylmethyldimethoxysilane, 3-aminopropylmethyldiethoxysilane, 3-mercaptopropyltrimethoxysiloxane, 3-mercaptopropyltriethoxysilane, vinyltrichlorosilane, vinyltrimethoxysilane, vinyltriethoxysilane, trifluoropropyltrichlorosilane, trifluoropropyltrimethoxysilane, trifluoropropyltriethoxysilane, and partial hydrolyzates thereof. The use of methoxysilane or ethoxysilane is preferred because they are easy to handle and the by-products are easy to distill off. These silane compounds and their partial hydrolyzates may be used alone or in admixture of two or more thereof.

Two exemplary methods for producing silicone resins of formula (1) by hydrolyzing the above-mentioned hydrolyzable silane compounds are given below.

In the first method, the silane compound is hydrolyzed in an organic solvent selected from aromatic hydrocarbons such as toluene and xylene, hydrocarbons such as hexane and octane, ketone compounds such as methyl ethyl ketone and methyl isobutyl ketone, ester compounds such as ethyl acetate and isobutyl acetate, and alcohols such as methanol, ethanol, isopropanol, butanol, isobutanol and t-butanol. The harmful organic solvent must then be removed, either at atmospheric pressure or in vacuo, from the resulting silicone resin, which is water-insoluble by itself. The organic solvent may simply be removed to give a viscous liquid or a solid. Alternatively, one may add a high-boiling radical-polymerizable vinyl monomer to be used in the next step, then drive off the low-boiling organic solvent in the presence of the vinyl monomer to leave a solution which contains no organic solvent.

The second method that may be used for obtaining the silicone resin of formula (1) from a hydrolyzable silane compound involves the hydrolysis of a hydrolyzable silane compound other than chlorosilane in water. In order to remove the organic solvent and also to induce the growth of the silicone resin to a degree where it becomes insoluble in water, the hydrolyzed product is heated at atmospheric pressure or in vacuo to distill off the organic solvent. A part of water may be distilled off together. Then a silicone resin bearing numerous silanol groups which contains no organic solvent and is insoluble in water is obtained in a state either dispersed in water or separated and precipitated out from water. After separating the silicone resin from water, a radical-polymerizable vinyl monomer may be added to the silane resin to give a solution thereof. Alternatively, one may add a radical-polymerizable vinyl monomer to the aqueous dispersion of the silicone resin, then separate out the silicone resin as a vinyl monomer solution thereof.

Hydrolysis catalysts may be employed when carrying out hydrolysis. Catalysts known to the art may be used as the hydrolysis catalyst, although preferred catalysts are those which exhibit a pH of 2 to 7 as aqueous solutions. Preferable hydrolysis catalysts include acidic hydrogen halides, carboxylic acids and sulfonic acids, acidic or weakly acidic inorganic salts, and solid acids such as ion exchange resins. Examples of such catalysts include hydrogen fluoride, hydrochloric acid, nitric acid and sulfuric acid, organic acids such as acetic acid and maleic acid, methylsulfonic acid, and cation exchange resins having sulfonic groups or carboxyl groups on the surface. The amount of the hydrolysis catalyst is preferably within a range of 0.001 to 10 mol % per mole of hydrolyzable groups on the silicon atoms.

Each of these silicone resins is mixed with the radical-polymerizable vinyl monomer as the second component. The resulting mixture is emulsion polymerized in water, thereby producing an emulsion. The radical-polymerizable vinyl monomer may be selected from the following vinyl monomers known to the art, so long as the vinyl monomer which is used can be radical-polymerized:

(a) (meth)acrylic acid esters such as the methyl, ethyl, propyl, isopropyl, butyl, isobutyl, octyl, 2-ethylhexyl, lauryl, stearyl and cyclohexyl esters of acrylic acid and methacrylic acid;

(b) carboxyl group- or carboxylic anhydride-containing vinyl monomers such as acrylic acid, methacrylic acid and maleic anhydride;

(c) hydroxyl group-containing vinyl monomers such as 2-hydroxyethyl (meth)acrylate and 2-hydroxypropyl (meth)acrylate;

(d) amide group-containing vinyl monomers such as (meth)acrylamide, N-methylol. (meth)acrylamide, N-methoxymethyl (meth)acrylamide, N-butoxymethyl (meth)acrylamide and diacetone (meth)acrylamide;

(e) amino group-containing vinyl monomers such as dimethylaminoethyl (meth)acrylate and diethylaminoethyl (meth)acrylate;

(f) alkoxyl group-containing vinyl monomers such as methoxyethyl (meth)acrylate and butoxyethyl (meth) acrylate;

(g) glycidyl group-containing vinyl monomers such as glycidyl (meth)acrylate and glycidyl allyl ether;

(h) vinyl ester monomers such as vinyl acetate and vinyl propionate;

(i) aromatic vinyl monomers such as styrene, vinyltoluene and α-methylstyrene;

(j) cyano group-containing vinyl monomers such as (meth)acrylonitrile;

(k) vinyl halide monomers such as vinyl chloride and vinyl bromide;

(l) vinyl monomers having two or more radical-polymerizable unsaturated groups per molecule, such as divinylbenzene, allyl (meth)acrylate, ethylene glycol di(meth)acrylate, diethylene glycol di(meth)acrylate and trimethylolpropane tri(meth)acrylate;

(m) (poly)oxyethylene chain-bearing vinyl monomers such as (poly)oxyethylene mono(meth)acrylates having 1 to 100 ethylene oxide groups;

(n) diorganopolysiloxanes with from 1 to 200 siloxane units and having a radical-polymerizable functional group at one end, such as dimethylpolysiloxanes having a (meth)acryloxypropyl group at one end and dimethylpolysiloxanes having a styryl group or an a-methylstyryl group at one end; and (o) radical-polymerizable group-containing silane compounds, such as vinyltrimethoxysilane, vinyltriethoxysilane, vinylmethyldimethoxysilane, vinylmethyldiethoxysilane, 5-hexenyltrimethoxysilane, 3-(meth) acryloxypropyltrimethoxysilane, 3-(meth) acryloxypropyltriethoxysilane, 3-(meth) acryloxypropylmethyldimethoxysilane, 3-(meth) acryloxypropylmethyldiethoxysilane, 4-vinylphenyltrimethoxysilane, 3-(4-vinylphenyl) propyltrimethoxysilane and 4-vinylphenylmethyltrimethoxysilane.

Of these, the use of alkyl (meth)acrylates having alkyl groups with from 1 to 18 carbon atoms is preferred. The content of alkyl (meth)acrylate is preferably about 1 to 100 mol % of the radical-polymerizable vinyl monomer. At a content of less than about 1 mol %, chemical resistance and other desirable properties would not be obtained. A content within the range of 30 to 99 mol % is even more preferable.

When endowing the cured film with such properties as solvent resistance and chemical resistance, it is advantageous to copolymerize a radical-polymerizable monomer bearing a crosslinkable functional group. Preferable examples of such monomers include the radical-polymerizable functional group-bearing silane compounds classified into (o) above which are able to form siloxane bonds via a condensation reaction, and the glycidyl group-bearing vinyl monomers such as glycidyl (meth)acrylate and glycidyl allyl ether classified into (g) above which have an epoxy functional group that is expected to crosslink via a carboxylic acid/epoxy group ring-opening reaction. Of the two classes, a silane compound is preferable because the other resin employed in the relevant system is a silanol group-bearing silicone resin.

It is preferred that this silane compound be a vinyl-polymerizable functional group-bearing hydrolyzable silane of the following general formula (2):

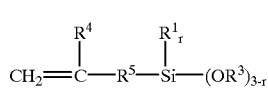
(2)

wherein $R^4$ is a hydrogen atom or a methyl group; $R^5$ is a divalent organic group such as an alkylene, arylene or alkylenearylene group which has from 1 to 10 carbon atoms and may have an intervening group such as oxygen and —COO—; letter r is 0, 1 or 2; and $R^1$ and $R^3$ are as defined above.

The content of the vinyl-polymerizable functional group-bearing hydrolyzable silane of formula (2) is preferably from 0.01 to 10 mol %, and more preferably from 0.1 to 5 mol %, of the overall radical-polymerizable vinyl monomer. Outside this range, sufficient solvent resistance and chemical resistance would not be exhibited at a too low content whereas a too high content would cause over-crosslinking and hence, cracking of the film.

When it is desired to impart lubricity to the surface, the copolymerization of a diorganopolysiloxane classified into (n) above having a radical-polymerizable functional group on one end is preferred.

This radical-polymerizable vinyl monomer is preferably used in an amount of about 10 to about 1,000 parts by weight per 100 parts by weight of the silicone resin as the first component. Less than 10 parts by weight of the vinyl monomer is inadequate with respect to film formability and chemical resistance. More than 1,000 parts by weight of the vinyl monomer would undesirably form a film having inferior weathering resistance and water resistance due to oxidative degradation induced by the photocatalyst particles. The use of the radical-polymerizable vinyl monomer in an amount of about 30 to about 300 parts by weight is even more preferable.

The water-dispersed emulsion of the invention preferably comprises an emulsion polymer of the silicone resin with the radical-polymerizable vinyl monomer, and is substantially free of organic solvents having a boiling point of less than 100° C. and aromatic organic solvents. Examples of the organic solvents include all such solvents known to the art, such as methanol, ethanol, propanol, isopropanol, butanol, t-butanol, hexanol, cyclohexanol, phenol and other alcohols; toluene, xylene and other aromatic solvents; acetone, methyl ethyl ketone, methyl isobutyl ketone, cyclohexanone and other ketones; ethyl acetate, butyl acetate, isobutyl acetate, ethyl lactate and other esters; diethyl ether, dibutyl ether, tetrahydrofuran, dioxane and other ethers; ethylene glycol monomethyl ether, ethylene glycol monobutyl ether, ethylene glycol monobutyl ether acetate and other ethylene glycol derivatives; propylene glycol monomethyl ether, propylene glycol monomethyl ether acetate and other propylene glycol derivatives; as well as acetonitrile, dimethylsulfoxide and dimethylformamide. These solvents cause environmental pollution, are harmful to humans, disrupt the stability of the emulsion, and hinder the formation of a uniform film following application. It is thus preferred that the water-dispersed emulsions of the invention be substantially free of such solvents.

However, as long as "silicone resin/acrylic resin" composite emulsions are concerned, the formation of emulsions containing substantially no solvent has been impossible by methods heretofore known to the art, as mentioned above. This is because silicone resins having highly reactive silanol groups at an end of their molecule, if they are low molecular weight polymers, are water-soluble, but are unstable and tend to change markedly over time in the absence of organic solvents. Conversely, as high molecular weight polymers, these silicone resins are quite stable, but insoluble in water; moreover, in the absence of organic solvents, they tend to solidify, which makes them difficult to render into emulsions.

For these reasons, as already noted, it has hitherto been the practice to make concomitant use of the low boiling point organic solvent or the aromatic organic solvent such as toluene or to use as a starting material an alkoxysilane compound or a partial hydrolyzate thereof. According to the present invention, an emulsion containing substantially no organic solvent can be obtained by removing as much as possible the low boiling point organic solvents and aromatic organic solvents, typically alcohols which have formed as by-products upon hydrolysis of the hydrolyzable silane compound, from the solution of silicone resin that has been polycondensed to a degree where it is insoluble by itself in water, converting the silicone resin to a solution thereof in a radical-polymerizable vinyl monomer, and thereafter, carrying out emulsion polymerization. Accordingly, there is a possibility that a trace amount of the above-said unremovable organic solvent be present within the emulsion of the invention. In order to avoid the above-described problems, the amount of organic solvents must be limited to less than 5% by weight, and preferably less than 2% by weight, based on the combined amount of the first and second components. Such an emulsion has little problem on pollution and has an excellent stability since the emulsion is substantially free of alcohol.

In the practice of the invention, a film forming assistant may be blended in the coating composition of the invention, provided that the assistant is soluble or uniformly dispersible in water and has a boiling point of at least 100° C. The film forming assistant is left in the coating even after the majority of water is evaporated off, insures fluidity to the coating until the coating is completely cured, and thus provides for repair of the coating which is roughened by the evaporation, imparting uniformity to the coating. In order to obtain a satisfactory film, it is necessary that the non-reactive film forming assistant eventually disappear from the cured coating. For this reason, the film forming assistant should preferably be free of a hydroxyl group which is able to bond with a silicon atom through ester exchange reaction. More specifically, the film forming assistant is preferably an organic solvent having a boiling point of at least 100° C., more preferably 100 to 250° C., especially 100 to 200° C. Organic solvents having a too high boiling point have a greater possibility of being left behind in the coating. Preferred examples of the organic solvent which can be used herein include alcohols such as 1-butanol, isobutyl alcohol, 2-pentanol, 3-pentanol, isopentyl alcohol, methyl lactate, ethyl lactate, and 3-methyl-3-methoxybutanol; polyols such as 1,2-propane diol, 1,3-butane diol, 1,4-butane diol, 2,3-butane diol, 1,5-pentane diol, 2-methyl-2,4-pentane diol, glycerin, and trimethylol propane; ethylene glycol derivatives such as 2-butoxyethanol, 2-phenoxyethanol, 2-ethoxyethyl acetate, 2-butoxyethyl acetate, and diethylene glycol monobutyl ether acetate; propylene glycol derivatives such as 1-methoxy-2-propanol, 1-ethoxy-2-propanol, 1-methoxy-2-methylethyl acetate, 1-ethoxy-2-methylethyl acetate, dipropylene glycol, dipropylene glycol monomethyl ether, dipropylene glycol monoethyl ether, and dipropylene glycol monomethyl ether acetate; butylene glycol derivatives such as 3-methoxybutyl acetate; ketones such as cyclohexanone; and esters such as butyl acetate, isobutyl acetate, γ-butyrolactone, propylene carbonate, and dibutyl phthalate. Of these, alkylene glycol derivatives such as 2-ethoxyethyl acetate, 2-butoxyethyl acetate, diethylene glycol monobutyl ether acetate, 1-ethoxy-2-methylethyl acetate, and dipropylene glycol monomethyl ether acetate are especially preferred from the leveling standpoint. These organic solvents contribute solely to the formation of a uniform coating without breaking the stability of the emulsion because they are less water soluble as compared with low-boiling alcohols such as methanol and ethanol. Toluene, xylene and analogous solvents which have a boiling point of higher than 100° C., but are not uniformly dispersible in water are excluded because they do not achieve the desired benefit, but can adversely affect the coating composition of the invention. An equal effect is obtained whether the film forming assistant is added to a vinyl monomer solution prior to emulsion polymerization or an emulsion after emulsion polymerization.

An appropriate amount of the film forming assistant added is 0 to 20 parts, especially 1 to 15 parts by weight per 100 parts by weight of the silicone resin. If more than 20 parts of the film forming assistant is added, a more fraction of the film forming assistant can be left in the coating after the completion of curing, adversely affecting the properties of the coating.

Surfactants are often used in emulsion polymerization. The surfactant may be any of nonionic, cationic, and anionic surfactants hitherto known to the art, and reactive emulsifying agents having a radical-polymerizable functional group. Exemplary surfactants include nonionic surfactants such as polyoxyethylene alkyl ethers, polyoxyethylene alkylphenyl ethers, polyoxyethylene carboxylates, sorbitan esters and polyoxyethylene sorbitan esters; cationic surfactants such as alkyltrimethylammonium chloride and alkylbenzylammonium chloride; anionic surfactants such as alkyl or alkylallyl sulfates, alkyl or alkylallyl sulfonates and dialkylsulfosuccinates; amphoteric surfactants such as amino acid-type and betaine-type surfactants; and various types of reactive surfactants as described in JP-A 27347/1996, including radical-polymerizable derivatives of (meth) acrylates, styrenes, and maleates which contain within the molecule such hydrophilic groups as sulfonates, polyoxyethylene chains and quaternary ammonium salts.

These surfactants may be used alone or in admixture of two or more. The surfactant is preferably used in an amount of about 0.5 to about 15% by weight, and more preferably about 1 to about 10% by weight, based on the resin solids in the emulsion.

Radical polymerization initiators may be used in emulsion polymerization. Examples of the radical polymerization initiator include persulfates such as potassium persulfate and ammonium persulfate; water-soluble initiators such as aqueous hydrogen peroxide, t-butyl hydroperoxide, t-butyl peroxymaleic acid, succinic acid peroxide and 2,2'-azobis-(2-N-benzylamidino)propane hydrochloride; oil-soluble initiators such as benzoyl peroxide, cumene hydroperoxide, dibutyl peroxide, diisopropyl peroxydicarbonate, cumyl peroxyneodecanoate, cumyl peroxyoctoate and azoisobutyronitrile; and redox initiators having combined therewith a reducing agent such as acidic sodium sulfite, Rongalite and ascorbic acid. The initiator is preferably used in an amount of about 0.1 to about 10% by weight, and more preferably about 0.5 to about 5% by weight, based on the radical-polymerizable vinyl monomer.

The method for preparing the emulsion used in the invention is generally classified into two types. One method begins with a first step in which the organic solvent is distilled off from the solution of the silanol group-bearing silicone resin which is water-insoluble by itself, to leave substantially only the active ingredient. In a second step, the silicone resin from which the organic solvent has been removed is added to and dissolved in a radical-polymerizable vinyl monomer compound to form a solution thereof. In a third step, a surfactant is added to the vinyl monomer solution of silicone resin resulting from the second step, which is emulsified and polymerized, thereby forming the end emulsion. In the first step of solvent removal, the solvent is advantageously driven off at as low a temperature as possible in order to retain the highly reactive silanol groups. Accordingly, this method is suitable for silicones having a relatively low silanol group content and an excellent stability because the organic solvent is once separated off. Where necessary, use can also be made of what is sometimes referred to as a solvent exchange method, in which the organic solvent is driven off in the presence of a relatively high-boiling radical-polymerizable vinyl monomer, so that the radical-polymerizable vinyl monomer takes the place of the solvent. Any of various techniques known to the art may be employed for emulsion polymerization, such as a batch charging process in which batch emulsification is followed by polymerization, or a monomer addition process in which polymerization is carried out with the continuous addition of a radical-polymerizable vinyl monomer-containing solution or an emulsion thereof. Other techniques that may be employed are a seed polymerization process in which a portion of the emulsion is pre-polymerized, and polymerization is continued while adding the remainder of the emulsion; and a core-shell polymerization process in which the monomer compositions for the core and the shell differ.

The other method for producing the emulsion begins with a first step in which the hydrolyzable silane compound is hydrolyzed in water and condensation-polymerized to give a silicone resin having silanol end groups. This is followed by a second step in which organic solvents such as the alcohol obtained as a by-product of hydrolysis are distilled off, leaving only the silanol group-bearing silicone resin component and water. In a third step, a radical-polymerizable vinyl monomer is added to the system consisting essentially of the silanol group-bearing silicone resin and water, in which the silicone resin is present in a dispersed or insoluble state, thereby dissolving the silicone resin in the vinyl monomer. The resulting radical-polymerizable vinyl monomer solution of the silicone resin separates from the aqueous phase. Next, in a fourth step, the silicone resin-containing solution resulting from the third step is emulsion polymerized using a surfactant. This method inhibits the condensation of the highly reactive silanol groups because the silicone resin is never present by itself in the series of steps. This method is thus suitable for water-insoluble silicone resins having many silanol groups. This method is also advantageous in that, compared with a silicone resin of the same composition which has been prepared in an organic solvent, this silicone resin which has been hydrolyzed and condensed in water gives a film having a higher hardness and a better flexibility, as well as an excellent curability.

Silicone resin emulsions that are prepared by these methods contain substantially no organic solvent, can have a silicone resin content of at least 30% by weight, preferably at least 50% by weight, and maintain a very high storage stability even after photocatalyst particles are mixed and dispersed therein.

In addition to the silicone resin emulsion, the coating composition of the invention contains a particulate photocatalyst. The particulate photocatalyst used herein should have a high enough photocatalytic activity to degrade organic groups which are distributed at the surface of the coating and render the surface hydrophobic. Preferable examples of the photocatalyst include titanium oxide, cerium oxide and zinc oxide. Anatase-type titanium oxide is especially preferable on account of its chemical stability and low cost. It is advantageous to use photocatalyst particles with a mean particle size of less than about 0.1 μm because the photocatalytic activity generally becomes higher the smaller the mean particle size. The term "mean particle size," as used herein, refers to the value calculated according to the Scherrer formula from the integrated width of the highest peak for the crystals in the x-ray diffraction pattern of a photocatalyst powder sample.

In the coating composition of the invention, for the film transparency and other reasons, the photocatalyst is typically used as a sol of photocatalyst particles colloidally dispersed within a dispersing medium. However, the photocatalyst particles may also be used as a paste containing water or solvent, or as a powder. Examples of the dispersing medium which may be used in the colloidal sol include water, alcohols such as methanol, ethanol, isopropanol, n-butanol and isobutanol, and Cellosolves. Of these, water is the most preferable in terms of the dispersion stability of the colloid and the mixing stability with the silicone resin emulsion. An organic solvent-dispersed sol may be used, provided the content of organic solvent in the overall coating composition is not greater than 5% by weight. When more than 5% by weight of organic solvent is present, the above-mentioned concerns over environmental pollution, safety during application, and storage stability of the coating fluid cannot be satisfied.

When the photocatalyst particles are used in the form of a powder or a paste, it is preferable to mix the catalyst with the emulsion and fully agitating the mixture in a mixer such as a sand mill or a paint shaker until a high dispersion is reached.

The amount of photocatalyst particles added to the emulsion is not critical, although an amount of about 10 to about 400 parts by weight per 100 parts by weight of the resin solids is preferable. Increasing the photocatalyst particle content speeds up the rate of hydrophilization of the coating surface, and results also in excellent antifouling properties. On the other hand, a higher content of the photocatalyst lowers the crack resistance. It is even more preferable to use about 50 to about 200 parts by weight of the photocatalyst particles per 100 parts by weight of the resin solids.

In addition to the two above-described essential components, the coating composition of the invention optionally contains additives, diluents and curing catalysts as described below.

Although the particulate photocatalyst is inherently deodorizing and antimicrobial on account of its powerful oxidizing effects when irradiated with light, a substance containing at least one metal element selected from silver, copper, platinum, gold, palladium, iron, nickel and zinc may also be contained in order to further increase these capabilities.

Well-known surfactants, titanate coupling agents and silane coupling agents may be added to enhance the stability of coating fluids of the inventive compositions.

The compositions of the invention can be applied onto various substrates, although film-forming agents and leveling agents may be added to enhance the film formability. Water-soluble polymers for increasing the viscosity of the coating fluid and enhancing film formability may be added as the film-forming agent. Examples include polyvinyl alcohol, polyacrylic acid, carboxymethyl cellulose, polyvinyl acetamide and polyvinyl pyrrolidone. Any well-known leveling agent may be used, although polyether-modified silicones are preferable. It is permissible to add a small amount of the film forming -assistant (organic solvent) in order to further enhance the film formability, as described above.

Any curing catalyst known to the prior art may be used in the compositions of the invention. Exemplary curing catalysts include basic compounds such as lithium hydroxide, sodium hydroxide, potassium hydroxide, sodium methylate, sodium acetate, potassium acetate, sodium formate, potassium formate, n-hexylamine, tributylamine, diazabicycloundecene, potassium propionate, tetramethylammonium chloride, tetramethylammonium hydroxide, ethylenediamine, hexanediamine, diethylenetriamine, triethylenetetramine, tetraethylenepentamine and ethanolamine; aminosilanes such as γ-aminopropyltrimethoxysilane; metal-containing compounds such as tetraisopropyl titanate, tetrabutyl titanate, aluminum triisobutoxide, aluminum triisopropoxide, aluminum acetylacetonate, aluminum perchlorate, aluminum chloride, cobalt octylate, cobalt acetylacetonate, iron acetylacetonate, tin acetylacetonate and dibutoxytin octylate; and acidic compounds such as p-toluenesulfonic acid, trichloroacetic acid, phthalic acid, hydrochloric acid, sulfuric acid, nitric acid and phosphoric acid. The curing catalyst is preferably used in an amount of 0.01 to 10% by weight, and more preferably 0.1 to 5% by weight, based on the total solids in the coating composition.

Combinations of acidic and basic compounds that serve as buffers for regulating the pH may be added. Examples include acetic acid with sodium acetate, and disodium hydrogen phosphate with citric acid. In order to impart an outstanding film performance, use can also be made of other ingredients such as pigments, dyes and storage stabilizers.

A hydrophilic film can be formed as follows. First, a diluent, various additives, and a curing catalyst are added to and mixed into the coating composition of the invention to prepare a coating fluid. The coating fluid is then applied to the substrate. The coating is air dried or heat cured to form a cured film. The cured film is then irradiated with UV-containing light so that the film surface may have a water-drop contact angle of no more than 60°.

Examples of the substrate material used herein include, without limitation, plastic moldings, ceramics, In glass, metals, wood, cellulose, and composites thereof. The method used for applying the inventive composition onto the substrate is not critical. Examples of such methods include spray coating, roller coating, dip coating, spin coating, and brush coating. Curing of the coating may be carried out in the same manner as in commonly employed coating curing methods. That is, the coating may be air dried by allowing it to stand in air, preferably at a temperature of from room temperature to 250° C. for a period of from about 2 minutes to about 6 hours. There are no strict limits on the heating temperature, time and other conditions so long as the temperature is no higher than the heat resisting limit of the substrate.

Sunlight suffices as the UV-containing light required to render the film surface hydrophilic. Any light source at any intensity may be used, provided it emits light having a wavelength region of 300 to 400 nm. For example, use may be made of light sources ranging from those having a high ultraviolet intensity, such as commercial black light lamps, mercury-vapor lamps and metal halide lamps, to indoor lighting such as fluorescent lamps and incandescent lamps. Although the dose of light required to make the film surface hydrophilic varies depending on the content of photocatalyst particles within the coating and the wavelength distribution of the light source, the film surface will generally acquire hydrophilicity to a contact angle with water of no more than 30° in a few days with excitation at an ultraviolet dose of about 0.001 mW/cm$^2$. The film surface will become hydrophilic in a shorter time upon exposure to sunlight since the sunlight that falls on the Earth's surface contains ultraviolet light with a dose of about 0.1 to 1 mW/cm$^2$.

The coating composition of the invention achieves a high degree of solvent reduction, which is a top priority in the field of paints and coating agents. In addition, the coating obtained from the inventive composition has good weathering resistance and antifouling properties. Specifically, by employing a water-dispersed silicone resin-containing emulsion as the binder and relying on the Ho photocatalytic reactions by the photocatalyst particles, the invention imparts the coating with a self-cleaning effect. Moreover, the dispersion stability of the photocatalyst particles is better in water having a high dielectric constant than in organic solvents, thereby preventing agglomeration of the particles. As a result, the coating composition also has an excellent dispersion stability. In addition, the water-dispersed emulsion of the invention contains substantially no organic solvent, has a far better storage stability than silicone resin-containing emulsions known to the prior art, and is able to fully maintain its stability in the presence of photocatalyst particles.

EXAMPLE

The following examples are provided to illustrate the invention, but not intended to limit the scope thereof. All parts and percents are by weight.

Preparation Examples 1 to 19 relate to the preparation of precipitated silicone resin/methyl methacrylate emulsions. Preparation Examples 1 to 5 describe the synthesis of silicone resins.

Preparation Example 1

A 2-liter flask was charged with 800 g of water, to which 408 g (3.0 mol) of methyltrimethoxysilane was added and thoroughly mixed under a nitrogen blanket and at a system temperature of lower than 10° C. Next, 162 g (9.0 mol) of 0.05N aqueous hydrochloric acid was added dropwise to the flask over 20 minutes, thereby carrying out a hydrolysis reaction. The solution was stirred 4 hours at room temperature, whereupon it gradually turned cloudy. The solution was ripened by heating for 2 hours at 40° C., following which the resulting methanol, water and low-boiling low polymers were distilled off at 50° C. and 50 mmHg. The remaining liquid was allowed to stand overnight, whereupon a white viscous substance settled to the bottom of the flask. A sample of this substance was measured for molecular weight by gel permeation chromatography (GPC), from which it was found to be a silicone resin (S-1) having a number average molecular weight of $2.0 \times 10^3$.

A portion of this white viscous substance was dissolved in methyl isobutyl ketone, and dehydration treatment was carried out. This resin solution was reacted with a methyl Grignard reagent, following which the silanol group content was measured and found to be 8.2% (based on the silicone resin). When a film of this resin was analyzed by infrared absorption spectroscopy, methoxy groups were not observed. The silicone resin obtained was thus confirmed to have the following average compositional formula.

$(CH_3)_{1.0}Si(OH)_{0.34}O_{1.33}$

There was no accompanying formation of organic solvent from this silicone resin. This compositional formula agreed closely with the results of $^{29}$Si-NMR analysis.

Methyl methacrylate (MMA), 300 g, was added to the above-prepared water-containing liquid of precipitated silicone resin, thereby re-dissolving the precipitated silicone resin to form a MMA solution of silicone resin. The solution was separated from the aqueous phase, collecting 511 g of a MMA solution (A-1) having a non-volatiles content of 41.9% (as measured after heating at 105° C. for 3 hours).

Preparation Example 2

A 2-liter flask was charged with 408 g (3.0 mol) of methyltrimethoxysilane and 300 g of toluene, to which 41 g (2.23 mol, as water) of 2.0% aqueous hydrochloric acid was added dropwise and mixed, at 40° C. and with stirring, over a period of one hour, thereby hydrolyzing the silane. The reaction product was ripened while stirring for one hour at 40° C. Next, 100 g of 10% sodium sulfate in water was added and stirring was carried out for 10 minutes. The mixture was left to stand, and the aqueous phase that separated out was discarded. This water washing operation was repeated two more times. Methanol and toluene were driven off from the resulting silicone resin solution at 50° C. and 50 mmHg. The remaining liquid was filtered to collect a toluene solution of the silicone resin.

This silicone resin had a number average molecular weight of $2.0 \times 10^3$ as measured by GPC. On quantitative analysis, it had a silanol group content of 4.2% (based on the silicone resin) and a methoxy group content of 1.4% (based on the silicone resin) as determined by the cracking method. The silicone resin (S-2) obtained in this example is thus represented by the average compositional formula.

$(CH_3)_{1.0}Si(OCH_3)_{0.03}(OH)_{0.17}O_{1.40}$

The level of methanol by-product from this silicone resin was at most 1.4% (silicone resin basis).

Next, the toluene was distilled off from this toluene solution under conditions of 50° C. and 50 mmHg, at which the condensation reaction that occurred was negligible, thereby giving a powder. This silicone resin (S-2) powder had a volatiles content of 0.3% (105° C., 3 hours). The silicone resin powder was then dissolved in methyl methacrylate (MMA) to form a MMA solution (A-2a) containing 70% of the silicone resin, and a MMA solution (A-2b) containing 40% of the silicone resin.

Preparation Example 3

A 5-liter flask was charged with 1,500 g of water, 900 g of toluene and 350 g of methanol, following which 423 g (2.0 mol) of phenyltrichlorosilane and 142 g (0.8 mol) of n-propyltrichlorosilane were added dropwise over a period of one hour while stirring, thereby carrying out a hydrolysis reaction. Stirring at room temperature for 2 hours was followed by ripening at 40° C. for 3 hours. To the solution was added 800 g of 10% sodium sulfate in water, and 20 minutes of stirring was carried out. The liquid was left at rest and the aqueous phase that formed was separated off. This water-washing step was repeated two more times, thereby giving a toluene solution of the silicone resin. The toluene was distilled from this solution under conditions of 60° C. and 10 mmHg, at which the condensation reaction that occurred was negligible, thereby giving 313 g of a solid silicone resin (S-3) in a powder form. This silicone resin had a volatiles content of 0.3% (105° C., 3 hours). It is represented by the average compositional formula:

$$Ph_{0.71}(CH_3CH_2CH_2)_{0.29}Si(OCH_3)_{0.03}(OH)_{0.15}O_{1.41}$$

wherein Ph is a phenyl group.

This solid silicone resin was dissolved in 135 g of methyl methacrylate to prepare 448 g of a MMA solution (A-3) containing 70% of the silicone resin.

Preparation Example 4

A 5-liter flask was charged with 500 g of methanol, 408 g (3.0 mol) of methyltrimethoxysilane, and 248 g (1.0 mol) of 3-methacryloxypropylmethyldimethoxysilane. While cooling below 10° C., 81 g (4.5 mol) of 2.0% aqueous hydrochloric acid was added dropwise to the flask, thereby carrying out a hydrolysis reaction. Stirring at room temperature for 2 hours was followed by ripening at 40° C. for 3 hours. Methanol and low-boiling substances were then completely driven off from the resulting methanol solution of silicone resin under conditions of 50° C. and 50 mmHg, at which negligible condensation arose, thereby giving 422 g of a viscous, light-yellow silicone resin liquid (S-4). This silicone resin had a volatiles content of 4.5% (105° C., 3 hours). It is represented by the average compositional formula:

$$(CH_3)_{1.0}R_{0.25}Si(OCH_3)_{0.22}(OH)_{0.25}O_{1.14}$$

wherein R is a 3-methacryloxypropyl group.

This liquid silicone resin was dissolved in 173 g of methyl methacrylate to prepare 595 g of a MMA solution (A-4) containing 70% of the silicone resin.

Preparation Example 5

Hydrolysis and condensation reactions were carried out in the same manner as in Preparation Example 4, but using 554 g (2.8 mol) of phenyltrimethoxysilane, 45 g (0.4 mol) of dimethyldimethoxysilane and 189 g (0.8 mol) of 3-glycidoxypropyltrimethoxysilane instead of the methyltrimethoxysilane and 3-methacryloxypropylmethyldimethoxysilane used in Preparation Example 4. There were obtained 538 g of a liquid silicone resin (S-5) having the compositional formula indicated below and a volatiles content of 3.8%, and 768 g of a MMA solution (A-5). The silicone resin (S-5) is represented by the average compositional formula:

$$Ph_{0.7}(CH_3)_{0.2}R_{0.2}Si(OCH_3)_{0.18}(OH)_{0.20}O_{1.26}$$

wherein R is a 3-glycidoxypropyl group.

Preparation Examples 6 to 19 describe the preparation of emulsions.

Preparation Example 6

A polymerizer equipped with a nitrogen gas inlet was charged with 584 parts of pure water, and with 0.38 part of sodium carbonate and 3.76 parts of boric acid as the pH buffers. After the temperature of the polymerizer contents was raised to 60° C. while stirring, the polymerizer was purged with nitrogen. To the polymerizer were added 4 parts of Rongalite L, 0.10 part of 1% aqueous disodium ethylenediaminetetraacetate and 0.03 part of a 1% aqueous solution of ferrous sulfate. At the same time, a mixture composed of 448 parts of silicone resin-containing MMA solution (A-1), 112 parts of butyl acrylate, 1.68 parts of t-butylhydroperoxide (purity, 69%), and 11.2 parts and 5.6 parts, respectively, of the reactive surfactants NOIGEN RN-20 and HITENOL HS-10 (trade names; both manufactured by Daiichi Kogyo Seiyaku K.K.) was uniformly added over a period of 2 hours while maintaining the temperature within the polymerizer at 60° C. The mixture was then reacted for another two hours at 60° C., thereby bringing polymerization to completion. The resulting emulsion (E-1) had a solids concentration of 50.6%.

Preparation Examples 7 to 10

Emulsions (E-2) to (E-5) having solids concentrations of 48 to 52% were obtained by the same method as in Preparation Example 6 except that silicone resin-containing MMA solutions (A-2) to (A-5) were used.

Preparation Examples 11 to 12
Emulsions Containinq No MMA

A liquid mixture of 100 g of silicone resin (S-4, S-5) and 3.0 g of the nonionic emulsifying agent polyoxyethylene sorbitan monooleate was stirred at a high speed using a homogenizer while at the same time gradually adding and mixing in 143 g of pure water, thereby carrying out emulsification. High-speed stirring was continued thereafter under the same conditions, resulting in the formation of a milky-white water-dispersed silicone resin emulsion (E-6, E-7) having a solids concentration of 40%.

Preparation Example 13
Silane Addition to Acrylic Emulsion, Followed by Copolymerization A polymerizer equipped with a nitrogen inlet was charged with 400 g of water, 70 g of methyl methacrylate, 25 g of butyl acrylate and 4 g of sulfosuccinic acid diester ammonium salt, which were emulsified by high-speed stirring. The emulsion was heated to 80° C., then combined with 0.5 g of ammonium persulfate and stirred for 2 hours to give an acrylic polymer emulsion. Next, a liquid mixture composed of 300 g of water, 200 g of methyl methacrylate, 120 g of butyl acrylate, 4 g of sulfosuccinic acid diester ammonium salt and 1 g of ammonium persulfate, and a liquid mixture composed of 8 g of 3-methacryloxypropyltrimethoxysilane, 41 g of methyltrimethoxysilane and 33 g of dimethyldimethoxysilane were separately added dropwise to the polymerizer over a period of 3 hours. The contents of the polymerizer were reacted at 90° C. for 5 hours, thereby obtaining a silicone resin emulsion (E-8) having a solids concentration of 40.5%.

Preparation Example 14

An emulsion (E-9) having a solids concentration of 41.8% was obtained by the same method as in Preparation Example 13 except that 9 g of 3-methacryloxypropylmethyldimethoxysilane and 90 g of phenyltrimethoxysilane were used instead of the 3-methacryloxypropyltrimethoxysilane, methyltrimethoxysilane, and dimethyldimethoxysilane.

Preparation Example 15
Silane Hydrolysis, Followed by Acrylic Emulsion Copolymerization A reaction vessel was charged with 200 g of deionized water, to which 20 g of 1.0% aqueous hydrochloric acid was added to give a weakly acidic aqueous solution. To the solution was added 20 g of methyltriethoxysilane and 6 g of 3-methacryloxypropyltrimethoxysilane. Hydrolysis reaction was carried out while maintaining the temperature at 30° C. After about one hour, a clear aqueous solution of a silicone resin bearing numerous silanol groups was obtained. Next, 50 g of deionized water and 0.6 g of a surfactant HITENOL N-08 (manufactured by Daiichi Kogyo Seiyaku K.K.) were added and thoroughly dissolved therein, yielding an aqueous emulsion of the silicone resin. In a separate procedure, a liquid mixture was prepared by the preliminary emulsification of 0.1 g of potassium persulfate, 12 g of methyl methacrylate, 15 g of butyl acrylate, 10 g of water and 0.03 g of HITENOL N-08. This liquid mixture was added dropwise over a period of one hour to the aqueous emulsion of silicone resin while maintaining the system under a nitrogen atmosphere and at 70 to 80° C., thereby carrying out emulsion polymerization. After the completion of dropwise addition, stirring was continued for 3 hours at 70 to 80° C., yielding a silicone resin-containing emulsion (E-10) having a solids concentration of 12.0%.

Preparation Example 16

An emulsion (E-11) having a solids concentration of 14.1% was produced by the same method as in Preparation Example 15 except that 25 g of methyltriethoxysilane was used and 10 g of 3-methacryloxypropylmethyldimethoxysilane was used instead of the 3-methacryloxypropyltrimethoxysilane.

Preparation Example 17
Addition of Silane to Emulsion Polymerized Emulsion

A vessel equipped with a stirrer was charged with 200 g of a methyl methacrylate-butyl acrylate copolymer emulsion obtained by emulsion polymerization (solids content, 50%), and the system was adjusted to pH 6.0 to 7.0 with a buffer. While maintaining the emulsion at 25° C., 20 g of methyltriethoxysilane was added dropwise over 20 minutes and was fully absorbed into the emulsion by high-speed stirring. There was obtained a silane-containing emulsion (E-12) having a solids concentration of 48.1%.

Preparation Example 18

An emulsion (E-13) having a solids concentration of 49.9% was produced by the same synthesis method as in Preparation Example 17 except that 10 g of methyltriethoxysilane and 10 g of 3-methacryloxypropyltrimethoxysilane were used instead of 20 g of methyltriethoxysilane.

Preparation Example 19

An emulsion (E-14) having a solids concentration of 51.2% was produced by the same synthesis method as in Preparation Example 17 except that 20 g of methyltrimethoxysilane oligomer (trimer on the average) was used instead of 20 g of methyltriethoxysilane.

Examples 1 to 20 and Comparative Examples 1 to 6 describe the preparation of coating compositions.

EXAMPLES 1 to 20

Coating fluids were prepared by blending Emulsions (E-1 to E-14) synthesized in Preparation Examples 6 to 19, an anatase-type titanium oxide sol having photocatalytic activity (water-dispersed; solids content, 15%; mean particle size, 0.01 $\mu$m), colloidal silica (water-dispersed; solids content, 15%), deionized water, and aluminum perchlorate or sodium acetate as the curing catalyst in the proportions shown in Tables 1 and 3. These coating fluids were applied and cured under the conditions indicated below. The tests described below were performed on the coatings.

Comparative Examples 1 to 6

Coating fluids containing no titanium oxide sol photocatalyst were prepared by blending the ingredients in the proportions shown in Table 2. The same tests as in Examples 1 to 20 were performed on the coatings obtained from these coating fluids.
(1) Application of Coating
  Substrate: aluminum plate
  Method of Application: The coating fluid was applied with a No. 14 bar coater, air dried for 30 minutes, and then cured at 150° C. for 20 minutes, forming a coating having a thickness of about 0.5 to 5 $\mu$m.
(2) Outdoor Exposure
  Coating samples were mounted on a weathering panel (tilted at 45°) set up on the grounds of Silicone-Electronics Materials Research Laboratory of Shin-Etsu Chemical Co., Ltd. (Matsuida-cho, Usui-gun, Gunma, Japan) and exposed to sunlight for an outdoor exposure period of 2 months.
(3) Evaluation of Coating
  Surface contact angle: A 5-$\mu$l droplet of pure water was dropped onto the sample surface and the contact angle was measured 30 seconds later using a contact angle tester Model CA-X150 (manufactured by Kyowa Kaimen Kagaku K.K.).
  Contaminant adhesion, Cracking resistance: Before and after the outdoor exposure test, the coating was visually assessed for contaminant adhesion and cracking.
(4) Storage Stability of Coating Composition
  After the coating composition was stored at 30° C. for 1 month, its appearance as the liquid (presence or absence of precipitates, change in viscosity) and the conditions of the coating (appearance, ability to become hydrophilic) formed therefrom were examined and compared with the results of the fresh composition.
(5) Organic Solvent Content Within Coating Composition
  The organic solvent content within the coating composition was quantitatively determined by an internal standard method using gas chromatography.
  The results of these tests are presented in Tables 1 to 3.

TABLE 1

| Constituents (parts by weight) | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Emulsion E-1 | 100 | | | | | | 100 | | | | |
| Emulsion E-2a | | 100 | | | | | | 100 | | | |
| Emulsion E-2b | | | 100 | | | | | | | | |

TABLE 1-continued

| Constituents (parts by weight) | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Emulsion E-3 | | | | 100 | | | | | 100 | | |
| Emuision E-4 | | | | | 100 | | | | | 100 | |
| Emulsion E-5 | | | | | | 100 | | | | | 100 |
| Titanium oxide sol | 350 | 267 | 133 | 400 | 200 | 167 | 67 | 450 | 267 | 333 | 133 |
| Silica sol | 17 | 67 | 33 | 33 | 80 | 33 | 17 | | | | |
| Aluminum perchlorate | 1 | 1 | 1 | 1 | 1 | 1 | | | | | |
| Sodium acetate | | | | | | | 1 | 1 | 1 | 1 | 1 |
| Deionized water | 1633 | 1565 | 670 | 1766 | 539 | 699 | 441 | 624 | 382 | 2899 | 3699 |
| Contact angle (before irradiation) | 76 | 82 | 78 | 71 | 86 | 68 | 89 | 82 | 86 | 76 | 89 |
| Contact angle (after 2 weeks) | 6 | 10 | 48 | 2 | 12 | 41 | 61 | 7 | 12 | 4 | 64 |
| Contact angle (after 2 months) | 2 | 5 | 24 | 1 | 4 | 18 | 42 | 4 | 5 | 1 | 51 |
| Contaminant adhesion | excel | excel | excel | excel | excel | excel | excel | excel | excel | excel | excel |
| Cracking resistance | excel | excel | excel | excel | excel | excel | excel | excel | excel | excel | excel |
| Storage stability | excel | excel | excel | excel | excel | excel | exael | excel | good | excel | excel |
| Organic solvent content (wt %) | 0.0 | 0.0 | 0.0 | 0.0 | 0.1 | 0.1 | 0.0 | 0.0 | 0.0 | 0.1 | 0.1 |

TABLE 2

| Constituents (parts by weight) | Comparative Examples | | | | | |
|---|---|---|---|---|---|---|
| | 1 | 2 | 3 | 4 | 5 | 6 |
| Emulsion E-1 | 100 | | | | | |
| Emulsion E-2a | | 100 | | | | |
| Emulsion E-2b | | | 100 | | | |
| Emulsion E-3 | | | | 100 | | |
| Emulsion E-4 | | | | | 100 | |
| Emulsion E-5 | | | | | | 100 |
| Titanium oxide sol | | | | | | |
| Silica sol | 367 | 334 | 167 | 433 | 280 | 200 |
| Aluminum perchlorate | 1 | 1 | 1 | 1 | 1 | 1 |
| Sodium acetate | | | | | | |
| Deionized water | 1633 | 1565 | 670 | 1766 | 539 | 699 |
| Contact angle (before irradiation) | 80 | 92 | 74 | 76 | 82 | 91 |
| Contact angle (after 2 weeks) | 77 | 86 | 70 | 70 | 80 | 88 |
| Contact angle (after 2 months) | 74 | 86 | 68 | 66 | 74 | 85 |
| Contaminant adhesion | poor | poor | poor | poor | poor | poor |
| Cracking resistance | fair | poor | poor | fair | poor | fair |
| Storage stability | good | excel | excel | excel | good | good |
| Organic solvent content (wt %) | 0.0 | 0.0 | 0.0 | 0.0 | 0.1 | 0.1 |

TABLE 3

| Constituents (parts by weight) | Examples | | | | | | | | |
|---|---|---|---|---|---|---|---|---|---|
| | 12 | 13 | 14 | 15 | 16 | 17 | 18 | 19 | 20 |
| Emulsion E-6 | 125 | | | | | | | | |
| Emulsion E-7 | | 125 | | | | | | | |
| Emulsion E-8 | | | 100 | | | | | | |
| Emulsion E-9 | | | | 100 | | | | | |
| Emulsion E-10 | | | | | 100 | | | | |
| Emulsion E-11 | | | | | | 100 | | | |
| Emulsion E-12 | | | | | | | 100 | | |
| Emulsion E-13 | | | | | | | | 100 | |
| Emulsion E-14 | | | | | | | | | 100 |
| Titanium oxide sol | 400 | 167 | 260 | 143 | 54 | 50 | 133 | 200 | 267 |
| Silica sol | 33 | | 65 | 36 | 14 | | 33 | 33 | 53 |
| Aluminum perchlorate | 1 | 1 | 1 | 1 | 1 | 1 | 1 | 1 | 1 |

TABLE 3-continued

| Constituents (parts by weight) | Examples | | | | | | | | |
|---|---|---|---|---|---|---|---|---|---|
| | 12 | 13 | 14 | 15 | 16 | 17 | 18 | 19 | 20 |
| Sodium acetate | | | | | | | | | |
| Deionized water | 400 | 646 | 1329 | 420 | 51 | 105 | 1234 | 730 | 2847 |
| Contact angle (before irradiation) | 80 | 89 | 78 | 80 | 88 | 66 | 69 | 72 | 67 |
| Contact angle (after 2 weeks) | 12 | 22 | 48 | 61 | 24 | 53 | 51 | 20 | 15 |
| Contact angle (after 2 months) | 13 | 20 | 40 | 58 | 20 | 22 | 48 | 18 | 10 |
| Contaminant adhesion | excel | excel | excel | excel | excel | excel | excel | excel | excel |
| Cracking resistance | good | good | excel | good | excel | excel | good | good | good |
| Storage stability | good | good | good | good | good | good | excel | good | good |
| Organic solvent content (wt %) | 0.7 | 0.4 | 0.2 | 0.3 | 2.5 | 2.4 | 0.3 | 0.5 | 0.0 |

With outdoor exposure, the coatings containing titanium oxide sol as the photocatalyst showed a marked decline in the surface contact angle and exhibited a self-cleaning effect. These coatings were thus confirmed to be fully antifouling.

Preparation Example 20

A 2-liter flask was charged with 850 g of deionized water and 8.1 g of 1N hydrochloric acid. While the flask was cooled with water so as to maintain the internal temperature below 30° C., with stirring, 816 g (6.0 mol) of methyltrimethoxysilane and 38 g (0.32 mol) of dimethyldimethoxysilane were added dropwise over 2 hours for hydrolysis. The reaction solution was ripened for 6 hours at 30° C. Methanol formed and water were distilled off at 60° C. and 30 mmHg in a total amount of 580 g. The reaction solution, which was cloudy at this point, was left to stand whereupon the silicone resin settled to the flask bottom. To this, 213 g of methyl methacrylate (MMA) and 213 g of butyl acrylate (BA) were added for dissolving the silicone resin again, obtaining 902 g of a MMA/BA solution of silicone resin. The solution was allowed to stand whereupon the aqueous layer separated off. To the organic layer, 18 g of 2-butoxyethyl acetate was added, obtaining a MMA/BA solution (A-6) (solids concentration 47.1%) of silicone resin (S-6). This silicone resin (S-6) is represented by the average compositional formula:

$$(CH_3)_{1.05}Si(OH)_{0.41}O_{1.27}.$$

Preparation Example 21

A 2-liter flask was charged with 700 g of deionized water and 20 g of 1N acetic acid. While the flask was cooled with water so as to maintain the internal temperature below 30° C., with stirring, 544 g (4.0 mol) of methyltrimethoxysilane and 110 g (0.5 mol) of 3-glycidoxypropylmethyldimethoxysilane were added dropwise over 1-½ hours for hydrolysis. The reaction solution was ripened for 5 hours at 30° C. Methanol formed and water were distilled off at 60° C. and 30 mmHg in a total amount of 392 g. The reaction solution, which was cloudy at this point, was left to stand whereupon the silicone resin settled to the flask bottom. To this, 213 g of methyl methacrylate (MMA) and 142 g of butyl acrylate (BA) were added for dissolving the silicone resin again, obtaining 720 g of a MMA/BA solution of silicone resin. The solution was allowed to stand whereupon the aqueous layer separated off. To the organic layer, 72 g of 2-butoxyethyl acetate was added, obtaining a MMA/BA solution (A-7) (solids concentration 43.1%) of silicone resin (S-7). This silicone resin (S-7) is represented by the average compositional formula:

$$(CH_3)_{1.0}R_{0.11}Si(OCH_3)_{0.03}(OH)_{0.40}O_{1.23}$$

wherein R is 3-glycidoxypropyl.

Preparation Example 22

A polymerizer equipped with a stirrer, condenser, and nitrogen gas inlet was charged with 300 parts of deionized water, and with 0.47 part of sodium carbonate and 4.7 parts of boric acid as the pH buffers. After the temperature of the polymerizer contents was raised to 60° C. while stirring, the polymerizer was purged with nitrogen. To the polymerizer were added 1.75 parts of Rongalite L, 0.12 part of 1% aqueous disodium ethylenediaminetetraacetate and 0.04 part of a 1% aqueous solution of ferrous sulfate. At the same time, a 269 part portion of 1,345 parts of an emulsion which had been prepared by adding a uniform mixture composed of 600 parts of silicone resin-containing MMA/BA solution (A-6), 15 parts of 3-methacryloxypropyltrimethoxysilane, and 2.1 parts of t-butylhydroperoxide (purity 69%) to an aqueous solution containing 7.0 parts of sodium lauryl sulfate and 14.0 parts of NOIGEN EA-170 (trade name, manufactured by Daiichi Kogyo Seiyaku K.K.) in 400 parts of deionized water and emulsifying the mixture by means of a homomixer, was added to the polymerizer to effect seed polymerization. While maintaining the temperature within the polymerizer at 60° C., the remainder of the emulsion was uniformly added over a period of 3-½ hours. The mixture was then reacted for another two hours at 60° C., thereby bringing polymerization to completion. The resulting emulsion (E-15) had a solids concentration of 44.8% and pH 7.2.

Preparation Example 23

By following the same procedure as in Preparation Example 22 except that the silicone resin-containing MMA/BA solution (A-7) was used, an emulsion (E-16) having a solids concentration of 42.6% was obtained.

Examples 21–34

Coating fluids were prepared by blending Emulsions (E-1 to E-5, E-15, and E-16) synthesized in the foregoing Preparation Examples, a dispersion of titanium oxide having photocatalytic activity (solids content, 15%; mean particle size, 0.04 μm), colloidal silica (water-dispersed; solids content, 15%), deionized water, aluminum chelate or sodium acetate as the curing catalyst, and 1-ethoxy-2-methylethyl acetate or 2-butoxyethyl acetate as the film forming assistant in the proportions shown in Table 4. These coating fluids were applied and cured under the conditions as in Examples 1 to 20. The tests were performed on the coatings as in Examples 1 to 20. The results are shown in Table 4.

TABLE 4

| Constituents (parts by weight) | Example | | | | | | | | | | | | | |
|---|---|---|---|---|---|---|---|---|---|---|---|---|---|---|
| | 21 | 22 | 23 | 24 | 25 | 26 | 27 | 28 | 29 | 30 | 31 | 32 | 33 | 34 |
| Emulsion E-1 | 100 | | | | | | | | | 100 | | | | |
| Emulsion E-2a | | 100 | | | | | | | | | 100 | | | |
| Emulsion E-2b | | | 100 | | | | | | | | | | | |
| Emulsion E-3 | | | | 100 | | | | | | | | 100 | | |
| Emulsion E-4 | | | | | 100 | | | | | | | | 100 | |
| Emulsion E-5 | | | | | | 100 | | | | | | | | 100 |
| Emulsion E-15 | | | | | | | 105 | | | | | | | |
| Emulsion E-16 | | | | | | | | 105 | 110 | | | | | |
| Titanium oxide sol | 400 | 350 | 267 | 200 | 167 | 67 | 333 | 267 | 333 | 350 | 267 | 200 | 133 | 400 |
| Silica sol | 67 | 33 | 67 | 33 | 17 | 17 | 33 | 67 | | | | | | |
| Aluminum chelate | 1 | | 1 | 1 | | | 1 | 1 | | 1 | | 1 | | |
| Sodium acetate | | 1 | | | 1 | 1 | | | 1 | | 1 | | 1 | 1 |
| 1-ethoxy-2-methylethyl acetate | 10 | | 100 | | 50 | | | | | 10 | 10 | | | |
| 2-butoxyethyl acetate | | 10 | | 100 | 50 | 45 | | 40 | | | | 30 | 5 | 5 |
| Deionized water | 422 | 506 | 467 | 566 | 665 | 765 | 483 | 560 | 516 | 539 | 622 | 669 | 761 | 494 |
| Contact angle (before irradiation) | 78 | 80 | 83 | 79 | 72 | 71 | 74 | 75 | 75 | 79 | 81 | 82 | 73 | 74 |
| Contact angle (after 2 weeks) | 5 | 6 | 10 | 15 | 33 | 48 | 3 | 6 | 8 | 8 | 7 | 20 | 38 | 20 |
| Contact angle (after 2 months) | 1 | 0 | 1 | 5 | 15 | 20 | 3 | 4 | 2 | 3 | 2 | 8 | 18 | 0 |
| Contaminant adhesion | Excel | Excel | Excel | Excel | Excel | Excel | Excel | Excel | Excel | Excel | Excel | Excel | Excel | Excel |
| Cracking resistance | Excel | Excel | Excel | Excel | Excel | Excel | Excel | Excel | Excel | Excel | Excel | Excel | Excel | Excel |
| Storage stability | Excel | Excel | Excel | Excel | Excel | Excel | Excel | Excel | Excel | Excel | Excel | Excel | Excel | Excel |
| Organic solvent content (wt %) | 1.3 | 0.9 | 10.2 | 10.5 | 5.5 | 5.4 | 5.4 | 0.7 | 5.1 | 1.1 | 1.1 | 2.8 | 0.4 | 0.7 |

The coating fluids prepared by the methods in Preparation Examples 1 to 9 had the best storage stability. The coating fluids prepared by the other methods contained relatively high levels of organic solvent. As a result, in spite of the excellent antifouling properties of the coatings obtained by the application of the latter coating fluids immediately following their preparation, these had an inferior storage stability, as evidenced, for example, by the formation of precipitates in the fluid and the diminished appearance of the coating following one month of storage.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A coating composition comprising an emulsion of a silicone resin dispersed in water, and photocatalyst particles, which forms a hydrophilic film having a water-drop contact angle of no more than 60° when irradiated with UV-containing light, wherein said emulsion of a silicone resin dispersed in water is of an emulsion polymer which has been obtained from as main components:

(i) 100 parts by weight of a water-insoluble, silanol group-bearing silicone resin of the average compositional formula (1):

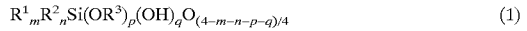

$$R^1{}_m R^2{}_n Si(OR^3)_p(OH)_q O_{(4-m-n-p-q)/4} \tag{1}$$

wherein $R^1$ is an unsubstituted monovalent hydrocarbon group; $R^2$ is a substituted monovalent hydrocarbon group; $R^3$ is an unsubstituted or substituted monovalent hydrocarbon group; and the letters m, n, p and q are numbers falling in the ranges $0.3 \leq m \leq 1.8$, $0 \leq n \leq 1.0$, $0 \leq p \leq 2.0$, $0 < q \leq 1.7$, $0.3 \leq m+n \leq 1.8$, $0 < p+q \leq 3.0$ and $0.3 < m+n+p+q < 4.0$, and (ii) 10 to 1,000 parts by weight of a radical-polymerizable vinyl monomer, said emulsion being essentially free of organic solvents having a boiling point of less than 100° C. and aromatic organic solvents.

2. The coating composition of claim 1 wherein said photocatalyst particles comprise at least one metal oxide selected from titanium oxide, cerium oxide and zinc oxide.

3. The coating composition of claim 1 wherein the photocatalyst particles are contained in an amount of 50 to 200 parts by weight per 100 parts by weight of the silicone resin.

4. The coating composition of claim 1 wherein said radical-polymerizable vinyl monomer contains 0.01 to 10 mol % of a vinyl-polymerizable functional group-bearing hydrolyzable silane of the general formula (2):

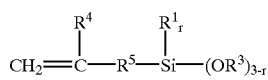

(2)

wherein $R^4$ is a hydrogen atom or a methyl group; $R^5$ is a divalent organic group; letter r is 0, 1 or 2; and $R^1$ and $R^3$ are as defined above.

5. The coating composition of claim 1 wherein said emulsion of a silicone resin dispersed in water has been obtained by emulsion polymerization of a mixture of the water-insoluble, silanol group-bearing silicone resin of formula (1) and the radical-polymerizable vinyl monomer, said mixture being substantially free of organic solvents having a boiling point of less than 100° C. and aromatic organic solvents.

6. The coating composition of claim 5 wherein said emulsion of a silicone resin dispersed in water has been obtained by a process comprising:
(a) obtaining a reaction mixture containing the silanol group-bearing silicone resin of formula (1) by hydrolyzing and condensing a hydrolyzable silane in water,
(b) removing a by-product of hydrolysis from the reaction mixture to leave only the silanol group-bearing silicone resin and water,
(c) adding a radical-polymerizable vinyl monomer to the system consisting essentially of the silanol group-bearing silicone resin and water, dissolving the silanol group-bearing silicone resin in the radical-polymerizable vinyl monomer, and then removing water therefrom to obtain a silanol group-bearing silicone resin-containing solution of the radical-polymerizable vinyl monomer, and
(d) emulsion polymerizing the silicone resin-containing solution in the presence of a surfactant.

7. A hydrophilic film formed from the coating composition of claim 1 and irradiated with UV-containing light, the film having a surface presenting a water-drop contact angle of no more than about 60°.

8. An article coated with the hydrophilic film of claim 7.

9. A process for preparing a hydrophobic film, comprising exposing to UV radiation a substrate coated with the coating composition of claim 1.

10. The coating composition of claim 1, wherein $R^1$ and $R^3$ are each independently $C_{1-10}$-alkyl, $C_{2-10}$-alkenyl, $C_{3-10}$-cycloalkyl, or $C_{5-10}$-aryl.

11. The coating composition of claim 1, wherein $R^2$ is $C_{1-10}$-alkyl, $C_{2-10}$-alkenyl, $C_{3-10}$-cycloalkyl, or $C_{5-10}$-aryl, substituted by halo, epoxy, a (meth)acryl group, an amino group, a sulfur-containing functional group, an alkyl ether group, an anionic group, or a quarternary ammonium salt.

12. The coating composition of claim 1, wherein $R^3$ is $C_{1-10}$-alkyl, $C_{2-10}$-alkenyl, $C_{3-10}$-cycloalkyl, or $C_{5-10}$-aryl, substituted by halo, epoxy, a (meth)acryl group, an amino group, a sulfur-containing functional group, an alkyl ether group, an anionic group, or a quarternary ammonium salt.

13. The coating composition of claim 11, wherein $R^2$ is fluorine, chlorine, gylcidyloxy, epoxycyclohexyl, methacryl, acryl, amino, aminoethylamino, phenylamino, dibutylamino, mercapto, tetrasulfide, (polyoxyalkylene) alkyl ether, carboxyl or sulfonyl.

14. The coating composition of claim 12, wherein $R^3$ is fluorine, chlorine, gylcidyloxy, epoxycyclohexyl, methacryl, acryl, amino, aminoethylamino, phenylamino, dibutylamino, mercapto, tetrasulfide, (polyoxyalkylene) alkyl ether, carboxyl or sulfonyl.

* * * * *